US010525683B2

(12) United States Patent
Cysewski et al.

(10) Patent No.: US 10,525,683 B2
(45) Date of Patent: Jan. 7, 2020

(54) HEATED DOUBLE DIAPHRAGM TOOL FOR DECORATIVE LAMINATE APPLICATION

(71) Applicant: The Boeing Company, Chicago, IL (US)

(72) Inventors: Sean Richard Cysewski, Snohomish, WA (US); Steven Prudnick, Everett, WA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 15/346,371

(22) Filed: Nov. 8, 2016

(65) Prior Publication Data

US 2018/0126715 A1 May 10, 2018

(51) Int. Cl.
*B32B 37/06* (2006.01)
*B32B 37/10* (2006.01)
*B32B 37/12* (2006.01)

(52) U.S. Cl.
CPC .......... *B32B 37/06* (2013.01); *B32B 37/1018* (2013.01); *B32B 37/12* (2013.01); *B32B 2607/00* (2013.01)

(58) Field of Classification Search
CPC . B32B 37/06; B32B 37/1018; B32B 2607/00; B32B 37/12
See application file for complete search history.

(56) References Cited

U.S. PATENT DOCUMENTS

| | | | | |
|---|---|---|---|---|
| 3,738,890 | A * | 6/1973 | Johnson | B30B 5/02 100/211 |
| 3,950,210 | A * | 4/1976 | Gibbs | B29C 51/10 156/367 |
| 3,996,091 | A * | 12/1976 | Daunt | B29C 51/10 156/367 |
| 4,350,545 | A * | 9/1982 | Garabedian | B32B 37/1018 156/87 |
| 5,714,179 | A | 2/1998 | Goodridge et al. | |
| 8,298,473 | B2 | 10/2012 | Dull et al. | |
| 8,511,362 | B2 | 8/2013 | Walczyk et al. | |
| 8,992,207 | B2 | 3/2015 | Dull et al. | |

(Continued)

OTHER PUBLICATIONS

Torr Technologies, Inc., Vacuum & Pressure Bagging Tools, Catalog No. 5, 1999, retrieved from the internet at http://www.torrtech.com/PDFs/TorrCatalog.pdf, 16 pages.

(Continued)

*Primary Examiner* — Christopher T Schatz
*Assistant Examiner* — Cynthia L Schaller
(74) *Attorney, Agent, or Firm* — Kolisch Hartwell, P.C.

(57) ABSTRACT

A panel laminator includes a first frame defining an outer boundary, the first frame operable to support a panel to be laminated and a first flexible diaphragm supported by the first frame to cover the outer boundary. The laminator includes a second frame sized and shaped to conform to the first frame along the outer boundary and a second flexible diaphragm supported by the second frame to match the outer boundary. The laminator includes a passage fluidly connected to the space between the first and second flexible diaphragms, with the passage configured to be coupled to a vacuum system in order to remove air from the space between the first and second flexible diaphragms during a lamination process. The first frame and the second frame are configured to rotate as a unit between a first, generally horizontal, orientation and a second, generally vertical, orientation.

20 Claims, 10 Drawing Sheets

(56) References Cited

U.S. PATENT DOCUMENTS

| | | | |
|---|---|---|---|
| 2002/0144401 A1* | 10/2002 | Nogueroles Vines | B29C 70/342 29/897.2 |
| 2013/0285282 A1* | 10/2013 | Mills | B29C 41/18 264/255 |
| 2014/0134378 A1* | 5/2014 | Downs | A43B 23/0225 428/57 |
| 2016/0089851 A1 | 3/2016 | Drexler et al. | |

OTHER PUBLICATIONS

Vacuum Laminating Technology Inc., Vacuum Frame Presses, 2002, retrieved from the internet at http://www.vacuum-press.com/table.html on Aug. 26, 2016, 3 pages.

LT Machines, Laminating Technology Double Membrane Press, Sep. 6, 2010, retrieved from the internet at http://www.laminatingtechnology.com/double_diaphragm.html on Aug. 30, 2016, 2 pages.

Wischt, Vacuum Membrane Press, YouTube Video retrieved from the internet at https://www.youtube.com/watch?v=bdzbWDQxQK4, Uploaded on Nov. 18, 2011, 12 pages.

Wischt, RVPM2 Technical Details, 2013, retrieved from the internet at http://www.wischt-vacuum-presses.com/index.php/products/rvpm2 on Aug. 26, 2016, 1 page.

Wischt, RVPM6 Technical Details, 2013, retrieved from the internet at http://www.wischt-vacuum-presses.com/index.php/products/rvpm6 on Aug. 26, 2016, 1 page.

Gesong, "TECFORMER" Vacuum Forming Press, YouTube Video retrieved from the internet at https://www.youtube.com/watch?v=HII7Gxg8X9s, Published Feb. 20, 2014, 11 pages.

* cited by examiner

HEATED DOUBLE DIAPHRAGM TOOL FOR DECORATIVE LAMINATE APPLICATION

FIELD

This disclosure relates to systems and methods for applying one or more decorative laminates to a part. More specifically, the disclosed examples relate to systems and methods for applying laminates to a part under vacuum pressure in a heated environment.

INTRODUCTION

Decorative laminates are used to make objects more visually appealing in a variety of industries, including the aircraft industry. For example, a passenger compartment of an aircraft may include several panels which may be designed to provide a pleasing appearance to the passengers while also performing a structural function. If such a panel is part of a wall structure, the decorative laminate may be applied to one side of the panel. If such a panel is part of an interior cabin divider, the decorative laminate may be applied to both sides of the panel.

An existing method for applying a decorative laminate to a part includes applying the laminate to the part with a spray adhesive and inserting the part into a plastic vacuum bag. The opening in the plastic bag is subsequently sealed around a vacuum hose and the air is evacuated from the bag. The air pressure outside the bag then exerts a force on the bag which presses the laminate against the part while the glue is allowed to cure at room temperature.

The vacuum bag solution is not optimal for several reasons. First, the vacuum bags do not always apply consistent pressure across the surface of the part which can lead to delaminations or other defects in the appearance of the applied laminate. Second, the ad-hoc nature of the vacuum seals mean the air pressure within the vacuum bag can only be so low. Third, it can take a relatively long time for the glue to cure at room temperature; up to 12 hours or more. Fourth, preparing the vacuum bag around the panel is also time consuming, as the bag must be cut to the appropriate size and sealed on one side, the part and laminate must be inserted, and the bag must be sealed properly around a vacuum hose. Other deficiencies may also exist.

Another existing method for applying a laminate to a part includes using relatively large and relatively expensive permanent vacuum tools. These tools often include a single flexible diaphragm made of silicone rubber which is positioned over a part resting on an inflexible base. Air is removed from the space between the base and the diaphragm and heat may be applied to expedite the curing process. These permanent tools are usually immobile and may take up a large amount of floor space, as they may be large enough to laminate several parts at once. Further, these permanent tools can cost up to five hundred thousand US dollars, often only accommodate parts which are largely planar, and often can only apply a laminate to one side of a part at a time.

There is a need for a tool that applies a consistent pressure across the surface of a part, applies a greater pressure than is possible with a vacuum bag, operates on a reduced time schedule, is quick to use, is easy to use, produces consistent laminate application results, is relatively inexpensive to construct and operate, can simultaneously apply laminate to more than one side of a part, is mobile, and has a reduced footprint in a manufacturing area.

SUMMARY

In some embodiments, a panel laminator includes a first frame defining an outer boundary, the first frame operable to support a panel to be laminated and a first flexible diaphragm supported by the first frame to cover the outer boundary. The panel laminator includes a second frame sized and shaped to conform to the first frame along the outer boundary and a second flexible diaphragm supported by the second frame to match the outer boundary. The panel laminator further includes a first heating blanket attached to the first frame distal from the first flexible diaphragm to create an isolated heated environment between the first heating blanket and the first flexible diaphragm, and enclosed by the first frame. The panel laminator further includes a second heating blanket attached to the second frame distal from the second flexible diaphragm to create an isolated heated environment between the second heating blanket and the second flexible diaphragm, and enclosed by the second frame. The panel laminator includes a permeable layer positioned between the first flexible diaphragm and the second flexible diaphragm, and a vacuum operable to connect a vacuum source to the permeable layer between the first flexible diaphragm and the second flexible diaphragm.

In some embodiments, an apparatus for laminating a panel includes a first flexible diaphragm and a first frame bound to the first flexible diaphragm. The apparatus includes a second flexible diaphragm and a second frame bound to the second flexible diaphragm. The second frame is configured to be coupled to the first frame so that the first flexible diaphragm is proximate the second flexible diaphragm, thereby creating a space between the first flexible diaphragm and the second flexible diaphragm. The apparatus includes a passage fluidly connected to the space between the first flexible diaphragm and the second flexible diaphragm, and the passage is configured to be coupled to a vacuum system in order to remove air from the space between the first flexible diaphragm and the second flexible diaphragm during a lamination process. The apparatus further includes a diaphragm support configured to (a) provide support for the first flexible diaphragm against gravity prior to activation of the vacuum system and (b) be spaced from the first flexible diaphragm after activation of the vacuum system and during a lamination process. The first frame and the second frame are configured to rotate as a unit between a first, generally horizontal, orientation and a second, generally vertical, orientation.

In some examples, a method of laminating a panel includes providing a panel and a laminate to be applied to the panel and providing a first flexible diaphragm bound to a first frame and a second flexible diaphragm bound to a second frame. The method includes securing the first frame to the second frame so that the panel and the laminate to be applied to the panel are enclosed within a space between the first flexible diaphragm and the second flexible diaphragm and evacuating air from the space between the first flexible diaphragm and the second flexible diaphragm. The method further includes heating an ambient environment around the first flexible diaphragm and the second flexible diaphragm, the panel, and the laminate by activating a first heating blanket attached to the first frame distal from the first flexible diaphragm and a second heating blanket attached to the second frame distal from the second flexible diaphragm.

The present disclosure provides various apparatus and methods for applying a laminate to a panel. In some embodiments, a panel laminator may include a pair of heating blankets held removed from a pair of flexible diaphragms surrounding a panel. In some embodiments, a portion of an apparatus may be rotated about a horizontal axis in order to reduce a footprint of the apparatus during or after a lamination process. In some embodiments, a diaphragm support may be disposed below one of the flexible diaphragms in order to physically support the flexible diaphragm and increase the quality of the applied laminate. Features, functions, and advantages may be achieved independently in various examples of the present disclosure, or may be combined in yet other examples, further details of which can be seen with reference to the following description and drawings.

DESCRIPTION

Overview

Various embodiments of a tool for decorative laminate application having first and second flexible diaphragms and methods of laminating a part are described below and illustrated in the associated drawings. Unless otherwise specified, the tool and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar devices. The following description of various embodiments is merely exemplary in nature and is in no way intended to limit the disclosure, its application, or uses. Additionally, the advantages provided by the examples, as described below, are illustrative in nature and not all examples provide the same advantages or the same degree of advantages.

Figure 1:
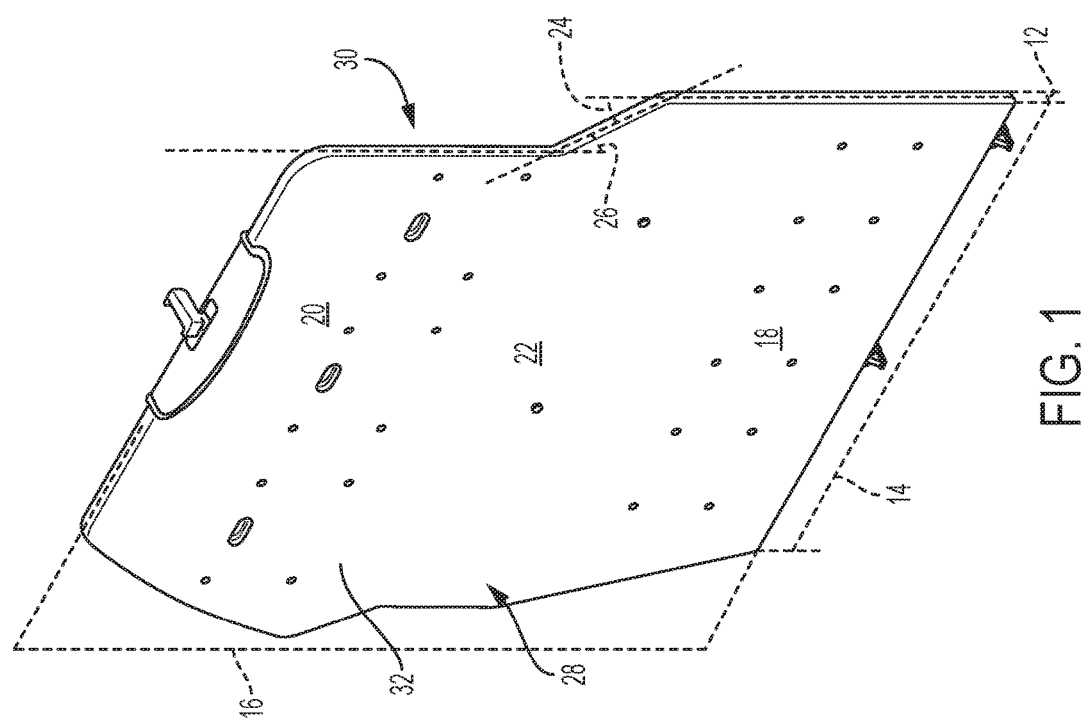
FIG. 1 is a diagrammatic representation of a perspective view of an illustrative panel.

FIG. 1 is a perspective view of an illustrative part, generally indicated at 10, to which one or more decorative laminates may be applied. Part 10 may have many sizes, shapes, and/or configurations. In some examples, part 10 may be a generally three-dimensional object where a thickness, width, and height of the object are all of the same order of magnitude. In some examples, part 10 may be a generally planar object, such as a flat panel, where a thickness of the panel is substantially smaller than both of a width and a height of the panel.

In some examples, part 10 may be a generally two-dimensional, non-planar object, where a thickness of the object is substantially smaller than two other dimensions of the object but the object cannot be made to lie in a single plane. An example of such a two-dimensional, non-planar object is a joggle panel, an example of which is shown in FIG. 1. Part 10 may have a thickness 12 that is substantially smaller than a width 14 and a height 16 of the part. For example, the width and/or the height of the part may be at least 10 times larger than the thickness of the part. Any of the thickness, width, and height of the part may vary along the part.

Part 10 may be a joggle panel having a first, generally planar, portion 18, a second, generally planar, portion 20, and a third, generally planar portion 22 disposed between the first and second portion 18 and 20. The third portion 22 may be angled with respect to one or both of the first and second portions 18 and 20. That is, third portion 22 may meet first portion 18 at a first joggle angle 24 and the third portion may meet second portion 20 at a second joggle angle 26.

Part 10 may have one or more faces to which a decorative laminate may be applied. In the case of the joggle panel shown in FIG. 1, the part may have a first major face 28 and a second major face 30. A first decorative laminate 32 may be applied to the first major face 28 and/or a second decorative laminate (not shown in FIG. 1) may be applied to the second major face 30. Either of the decorative laminates may completely or partially cover the respective major faces of the part.

EXAMPLES, COMPONENTS, AND ALTERNATIVES

The following sections describe selected aspects of exemplary panel laminators as well as related systems and/or methods. The examples in these sections are intended for illustration and should not be interpreted as limiting the entire scope of the present disclosure. Each section may include one or more distinct disclosures, and/or contextual or related information, function, and/or structure.

Example 1

This example describes an illustrative panel laminator having a pair of flexible diaphragms; see FIGS. 2-8.

Figure 2:
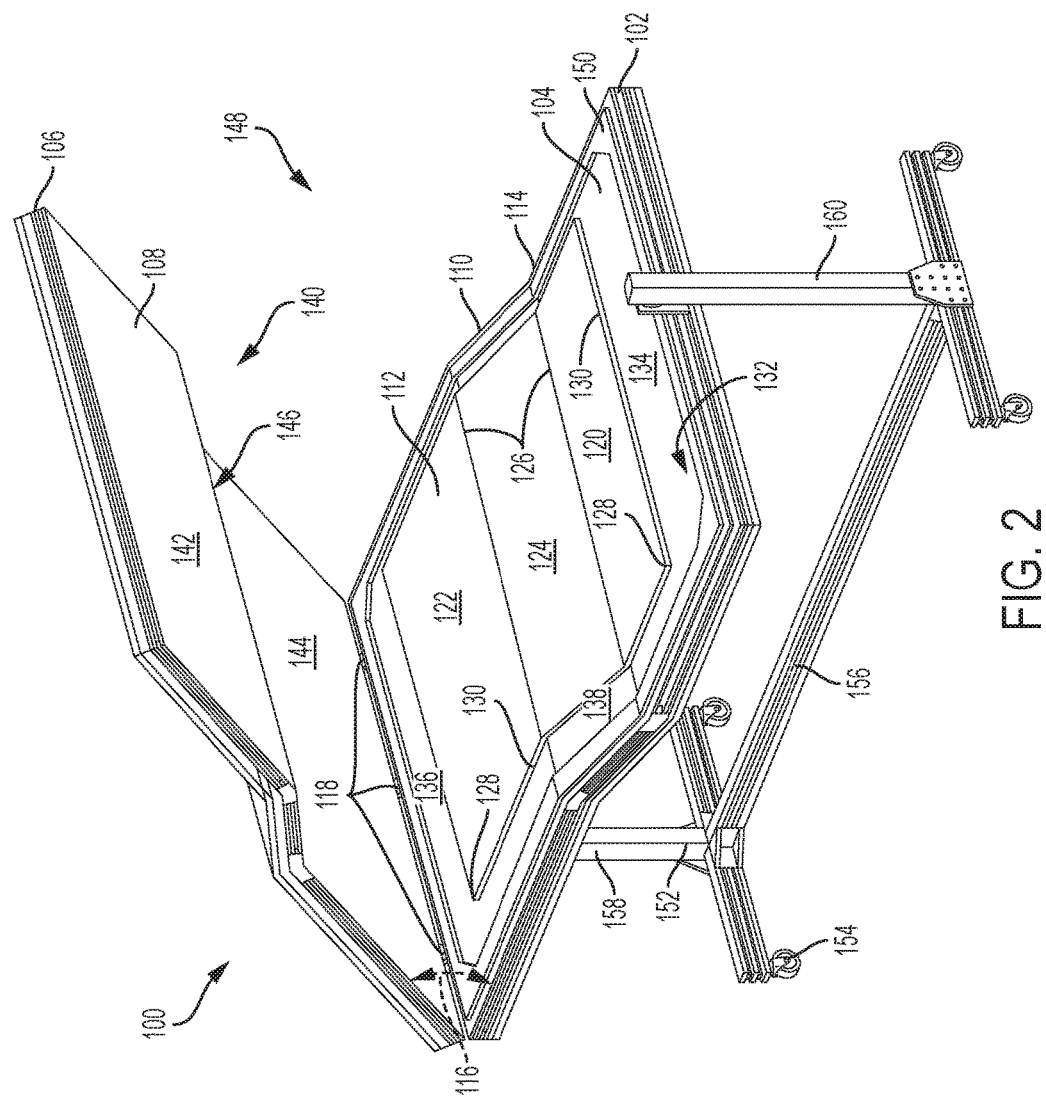
FIG. 2 is a diagrammatic representation of a perspective view of an illustrative embodiment of a panel laminator having a first flexible diaphragm and a second flexible diaphragm, showing the laminator in an open configuration and in a generally horizontal orientation.

FIG. 2 is a perspective view of an illustrative embodiment of a panel laminator, generally indicated at 100. Panel laminator may alternately be described as an apparatus for laminating a panel. Panel laminator includes a first frame 102, a first flexible diaphragm 104, a second frame 106, and a second flexible diaphragm 108. The first frame defines an outer boundary 110. The first frame is operable to support a panel 112 to be laminated. The first flexible diaphragm is supported by the first frame and covers the outer boundary.

First frame 102 may be substantially rigid and may be constructed of one or more rails, bars, or other long members connected together to form a closed loop. In some examples, the first frame may be bound to first flexible diaphragm 104 along a periphery 114 of the first flexible diaphragm. In some examples the first flexible diaphragm may have a larger area than the area bounded by the first frame and the periphery first flexible diaphragm may extend beyond outer boundary 110 defined by the first frame.

First flexible diaphragm 104 may have any appropriate structure or composition such that the first flexible diaphragm may be repeatably deformed and/or stretched. The first flexible diaphragm may also form a portion of an air-tight cavity. In some examples, first flexible diaphragm 104 is constructed of an elastomer, such as one of the many available formulations of silicone rubber.

Second frame 106 may be sized and/or shaped to conform to first frame 102 along outer boundary 110. In some examples, second frame 106 may be coupled to first frame 102 to provide for angular separation of the second frame relative to the first frame. FIG. 2 shows panel laminator 100 in an open configuration where second frame 106 is spaced angularly from first frame 102 by separation angle 116. The first and second frames may be coupled to one another via one or more hinges 118 in order to provide for the angular separation of the frames. Hinges 118 may be locking hinges capable of being locked in the open configuration shown in FIG. 2 so that panel 112 can be easily loaded into and out of the panel laminator.

In some embodiments, the first and second frames 102 and 106 may be completely detachable from one another. In these examples, the second frame may be first held away from the first frame until panel 112 is positioned over first flexible diaphragm 104 and second positioned over the first frame in order to enclose the panel between the first flexible diaphragm and second flexible diaphragm 108.

Second flexible diaphragm 108 may be supported by second frame 106 to match outer boundary 110. Second frame 106 may be bound to the second flexible diaphragm. Second flexible diaphragm 108 may be constructed of substantially similar materials as first flexible diaphragm 104.

In some examples, panel 112 may have a non-planar shape as was described in reference to part 10 above. In these examples, first frame 102 may have a three-dimensional shape which corresponds to the non-planar shape of the panel. Additionally, second frame 106 may have a three-dimensional shape which corresponds to the non-planar shape of the panel. Further, the three-dimensional shape of the first frame may be complementary to the three-dimensional shape of the second panel and vice versa.

In the illustrative embodiment shown in FIG. 2, panel 112 has a first generally planar portion 120, a second generally planar portion 122, and a third generally planar portion 124 disposed between the first and second portions. Third portion 124 is disposed at an angle to both the first and second portions so that first portion 120 is in a different plane than second portion 122. It will be appreciated that panel 112 may have a non-planar shape similar to, but not exactly the same as, the shape depicted in FIG. 2. For example, junctions 126 between the first, second and third generally planar portions 120, 122, and 124 need not be as sharp as depicted in FIG. 2 but may be rounded. In another example, corners 128 of panel 112 need not be sharp ninety-degree corners and edges 130 of the panel need not be straight even within the generally planar portions. Even the generally planar portion 120, 122, and 124 may not be strictly planar and may have a slight curvature to them.

First frame 102 may have a three-dimensional shape which may define a first frame area 132 which may be spanned by first flexible diaphragm 104. First frame area 132 may include a first sub-area 134, a second sub-area 136, and a third sub-area 138. When panel 112 is disposed within panel laminator 100, first generally planar portion 120 of panel 112 may be disposed proximate and generally parallel to first sub-area 134, second generally planar portion 122 of panel 112 may be disposed proximate and generally parallel to second sub-area 136, and third generally planar portion 124 of panel 112 may be disposed proximate and generally parallel to third sub-area 138.

Second frame 106 may have a three-dimensional shape which may define a second frame area 140 which may be spanned by second flexible diaphragm 108. Second frame area 140 may include a fourth sub-area 142, a fifth sub-area 144, and a sixth sub-area 146. When panel 112 is disposed within panel laminator 100 and the panel laminator is in a closed configuration (see FIG. 3), first generally planar portion 120 of panel 112 may be disposed proximate and generally parallel to fourth sub-area 142, second generally planar portion 122 of panel 112 may be disposed proximate and generally parallel to fifth sub-area 144, and third generally planar portion 124 of panel 112 may be disposed proximate and generally parallel to sixth sub-area 146.

Figure 3:
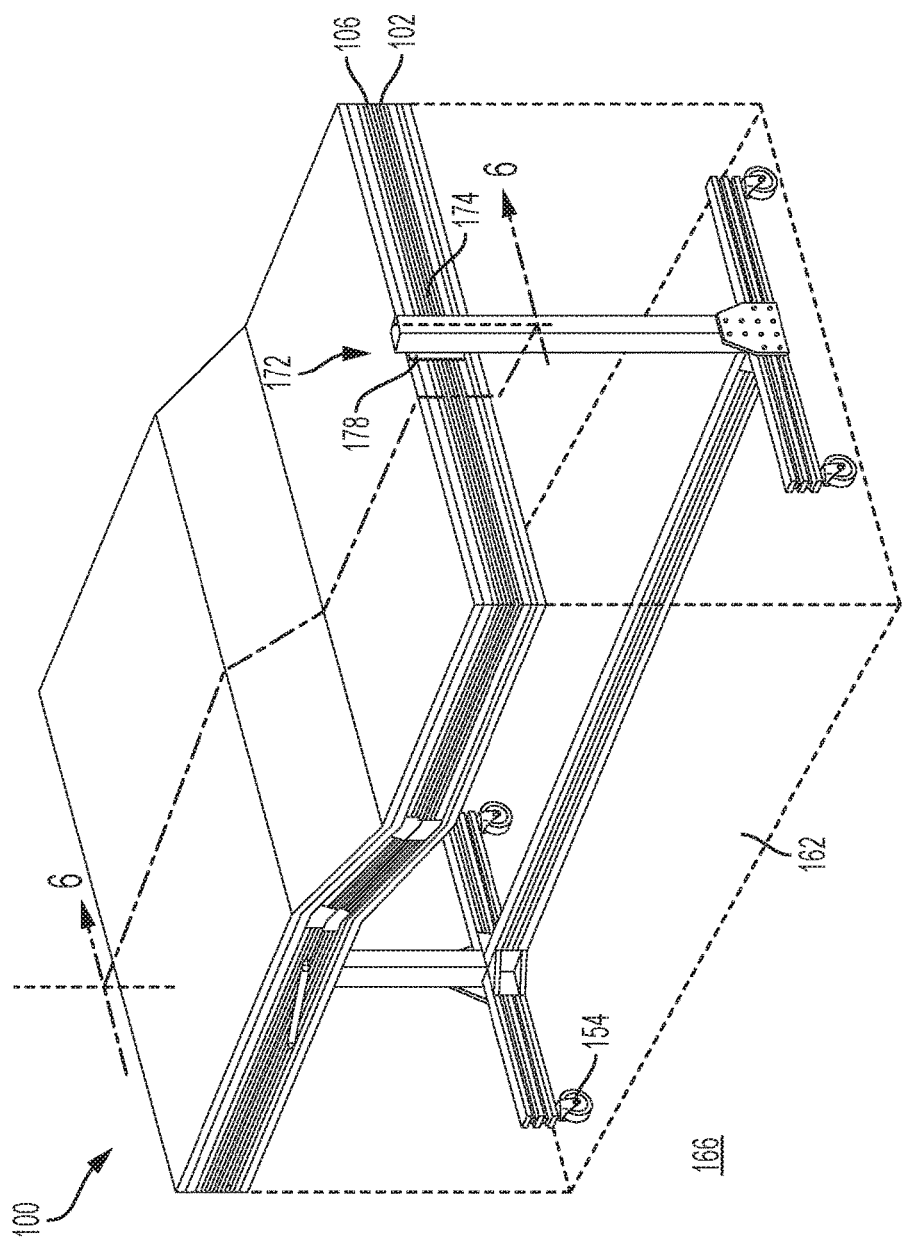
FIG. 3 is a diagrammatic representation of a perspective view of the panel laminator of FIG. 2, showing the laminator in a closed configuration and in a generally horizontal orientation.

When panel laminator is in a closed configuration, see for example in FIG. 3, first sub-area 134 may be adjacent or proximate fourth sub-area 142, second sub-area 136 may be adjacent or proximate fifth sub-area 144, and third sub-area 138 may be adjacent or proximate sixth sub-area 146. That is, the first and second frames 102 and 106 may have respective three-dimensional shapes which are complementary to one another.

Second frame 106 may be coupled to first frame 102 so that first flexible diaphragm 104 is proximate second flexible diaphragm 108, thereby creating a space 148 between the first flexible diaphragm and the second flexible diaphragm. During operation of panel laminator 100, panel 112 may be received within space 148 so that edges 130 of the panel are within the periphery 114 of the first flexible diaphragm and/or outer boundary 110.

Panel laminator 100 may include a permeable layer 150 positioned between first flexible diaphragm 104 and second flexible diaphragm 108. Permeable layer may be a breather layer and may facilitate evacuation of air from space 148 between the first and second flexible diaphragms. In some examples, permeable layer 150 may form a closed loop around edges 130 of panel 112. In some examples, when panel 112 is received within space 148 between the first and second flexible diaphragms, permeable layer 150 may be disposed between the edges of the panel and either or both of outer boundary 110 and periphery 114 of the first flexible diaphragm.

Panel laminator 100 may include a frame or apparatus support 152. Frame support 152 may physical support the remainder of the panel laminator. The frame support may include a plurality of wheels 154, which may allow the panel laminator to be moved around within a work space. Apparatus support 152 may include a base 156, a first upright 158, and a second upright 160. First upright 158 and second upright 160 may extend upward from base 156 and may be rotatably coupled to one or both of first frame 102 and second frame 106.

Figure 4:
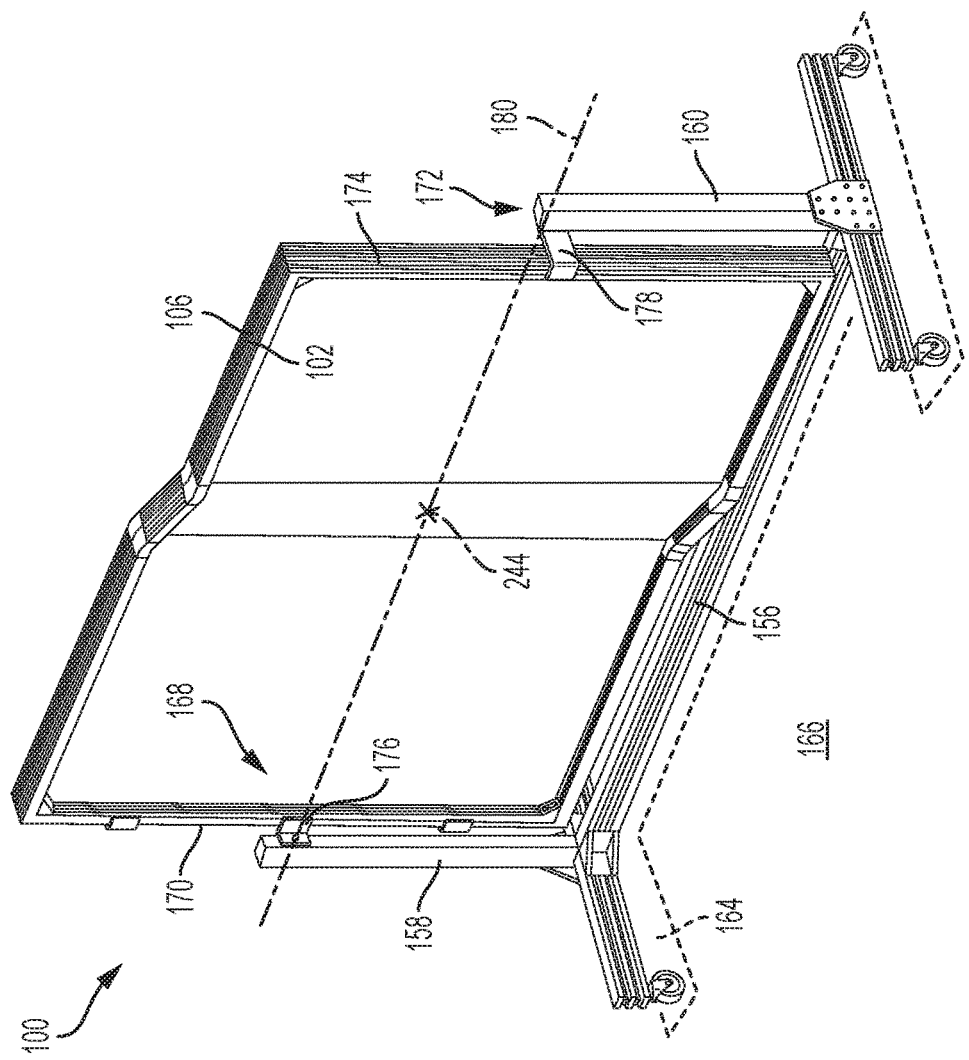
FIG. 4 is a diagrammatic representation of a perspective view of the panel laminator of FIG. 2, showing the laminator in the closed configuration and in a generally vertical orientation.

FIG. 3 is a perspective view of panel laminator 100, showing the panel laminator in a closed configuration and in a generally horizontal orientation. FIG. 4 is a perspective view of panel laminator 100, showing the panel laminator in the closed configuration and in a generally vertical orientation. FIGS. 3 and 4 are herein described together.

In the closed configuration shown in FIGS. 3 and 4, first frame 102 and second frame 106 may be secured to one another, perhaps via one or more clamps, latches, or other mechanisms. The first frame and the second frame may be configured to rotate as a unit when secured to one another between a first, generally horizontal, orientation (shown in FIG. 3) and a second, generally vertical, orientation (shown in FIG. 4).

When panel laminator 100 is in the first orientation, the panel laminator may have a first footprint 162 and when panel laminator 100 is in the second orientation, the panel laminator may have a second footprint 164 substantially smaller than first footprint 162. The first and second footprints may be roughly the area of floor space taken up in a work space 166 by the panel laminator in the first and second orientations, respectively. First footprint 162 may be determined by projecting the panel laminator vertically downward into the plane of work space 166 when the panel laminator is in the first, generally horizontal orientation. Second footprint 164 may be determined by projecting the panel laminator vertically downward into the plane of work space 166 when the panel laminator is in the second, generally vertical orientation.

Being able to reduce the size of the footprint of the panel laminator may provide advantages. Being able to move the panel laminator, for example via wheels 154, may provide advantages. In some examples, the panel laminator may be moved out of the way and be made to take up less space during a lamination process or when not in use. In some examples, panel laminator may be placed in the vertical orientation and then rolled into an oven for a curing process.

Panel laminator 100 may include a first rotatable connection 168 on a first edge portion 170 of first frame 102 and a second rotatable connection 172 of a second edge portion 174 of first frame 102. The first and second rotatable connections may be configured so that the first and second frames are configured to rotate as a unit when secured to one another.

First rotatable connection 168 may include a first coupler or bracket 176. First coupler 176 may be non-rotatably attached to first edge portion 170 of first frame 102 and rotatably attached to first upright 158. Second rotatable connection 172 may include a second coupler or bracket 178. Second coupler 178 may be non-rotatably attached to second edge portion 174 of first frame 102 and rotatably attached to second upright 160. The first and second couplers may allow the first and second frames 102 and 106 to rotate about a generally horizontal rotation axis 180.

Figure 5:
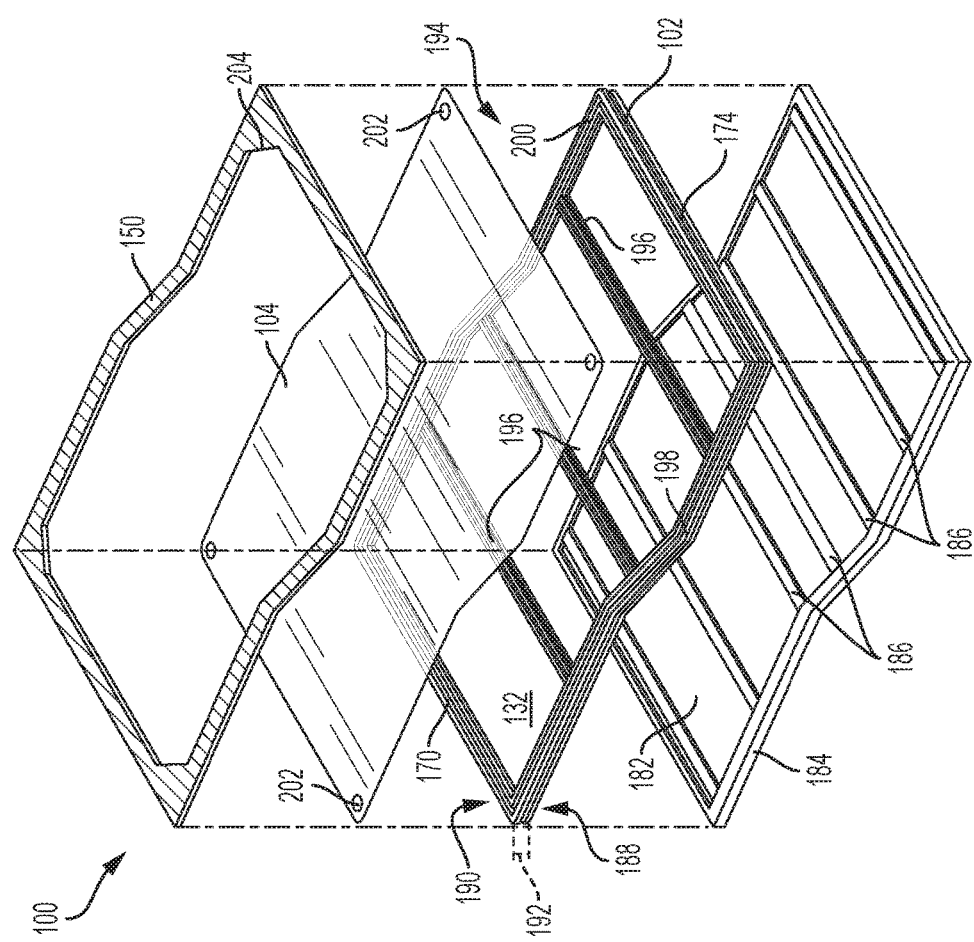
FIG. 5 is a diagrammatic representation of an exploded view of a portion of the panel laminator of FIG. 2, showing a first heating blanket, a first frame including diaphragm support bars, a first flexible diaphragm, and a permeable layer.

FIG. 5 is an exploded view of a portion of panel laminator 100, showing first frame 102, first flexible diaphragm 104, and breather layer 150. Panel laminator 100 may include a first heating blanket 182, a first insulation layer 184, and a set of retaining slats 186. First heating blanket 182 may provide heat to a panel and/or a decorative laminate during a lamination and/or a curing process. Heating a panel during a lamination process may substantially reduce the time required for any associated thermosetting adhesives to cure, as compared to a similar process where no heat is applied. Heating blanket 182 may include one or more electrical heating blankets which convert electrical energy into thermal energy.

First insulating layer 184 may serve an insulating function, wherein more heat is retained within panel laminator 100 during a lamination and/or curing process than if the first insulating layer were absent. The first insulating layer may improve efficiency of the apparatus and/or may reduce operating costs of the apparatus. The first insulating layer may serve a safety function, wherein people are protected from increased temperatures caused by, for example, first heating blanket 182.

First insulating layer 184 may have a rigid or semi-rigid structure which may be complementary to the shape of first frame 102. First heating blanket 182 may be secured to first insulating layer 184 by the set of retaining slats 186. First frame 102 may have a first side 188 to which first insulating layer 184 is coupled. First side 188 may be an under side of first frame 102 when in the horizontal orientation. First frame 102 may have a second side 190 to which first flexible diaphragm 104 is secured. Second side 190 may be an upper side of first frame 102 when in the horizontal orientation. First frame 102 may have a thickness 192 which may contribute to first heating blanket 182 being spaced from or distal from first flexible diaphragm 104.

Panel laminator 100 may include a diaphragm support 194. Diaphragm support 194 may be configured to provide support for first flexible diaphragm 104 against gravity prior to evacuation of air from the space between the first and second flexible diaphragms, perhaps due to activation of a vacuum source. Diaphragm support 194 may be configured to be spaced apart from the first flexible diaphragm after activation of a vacuum source and/or during a lamination process.

Diaphragm support 194 may span an area enclosed by first frame 102, for example first frame area 132. The diaphragm may include one or more support bars 196 extending from a first lateral portion 198 of the first frame to a second lateral portion 200 of the first frame. Each of the first lateral portion and the second lateral portion may extend from first edge portion 170 to second edge portion 174 of the first frame. The first and second lateral portions may be opposite one another.

One or more of the support bars 196 may have a three-dimensional shape which corresponds to a non-planar shape of a panel to be received in the space between the first and second flexible diaphragms. That is, one or more of the support bars may not extend along a straight line, but may have a degree of curvature along the length of the bar corresponding to the non-planar shape of the panel. In some examples, one of the one or more support bars may have curvature along the length of the one bar while another support bar of the one or more support bars may not have curvature along its length.

Panel laminator 100 may include one or more passages 202 fluidly connected to the space between first flexible diaphragm 104 and the second flexible diaphragm. The passage(s) may be configured to be coupled to a vacuum system or source in order to remove air from the space between the first and second flexible diaphragms during a lamination process. In the illustrative embodiment shown in FIG. 5, passage 202 may be through first flexible diaphragm 104 proximate permeable layer 150. In other embodiments, passage 202 may be through the second flexible diaphragm or may be disposed between the first and second flexible diaphragms.

One or more of passages 202 may alternately or additionally be characterized as a vacuum port operable to connect a vacuum source to permeable layer 150 between the first flexible diaphragm 104 and the second flexible diaphragm. The vacuum port may be in the first flexible diaphragm proximate the permeable layer. Permeable layer 150 may facilitate evacuation of air from the space between the first and second flexible diaphragms through the vacuum port during a lamination and/or curing process.

Permeable layer 150 may include enlarged corner sections 204 which may be configured to be aligned with the one or more passage 202 through first flexible diaphragm 104.

Figure 6:
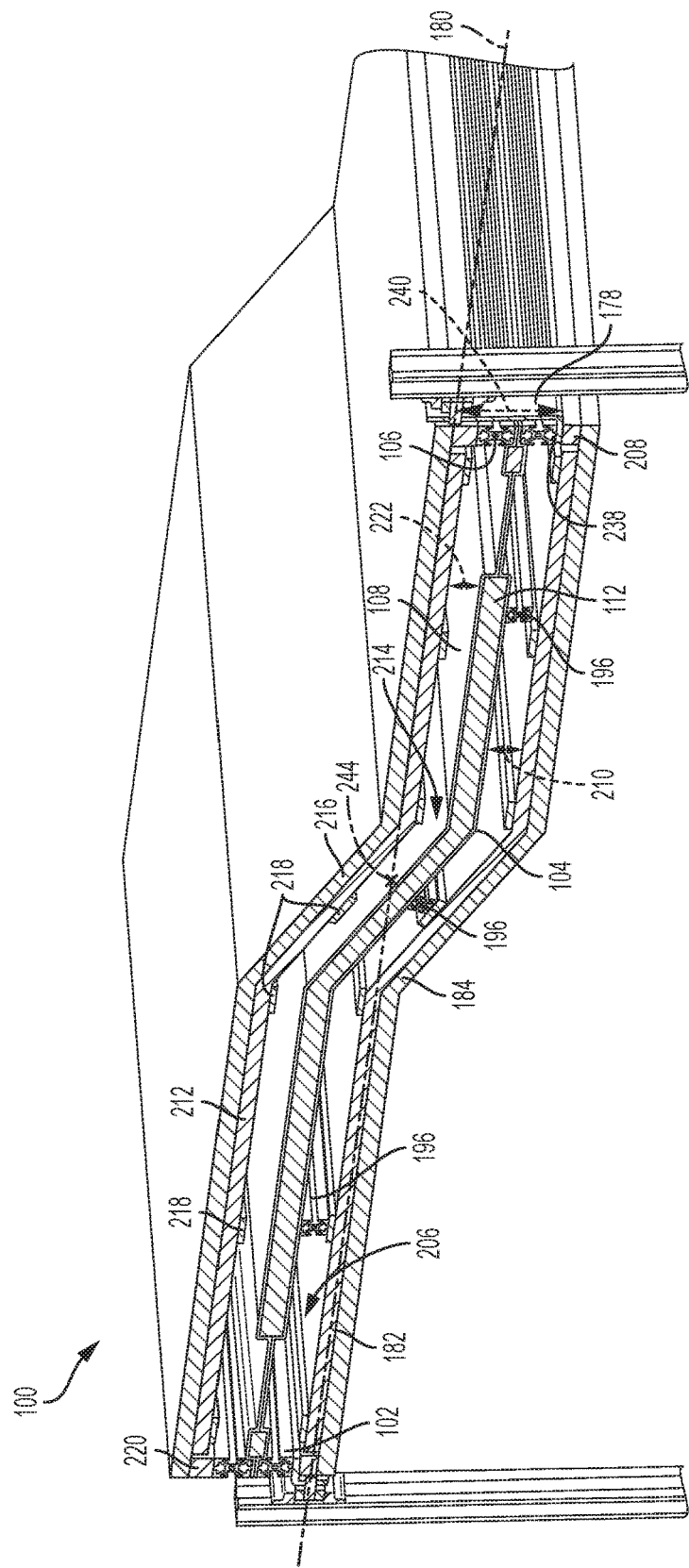
FIG. 6 is a diagrammatic representation of a sectional view of the panel laminator of FIG. 2, taken at 6-6 in FIG. 3.

FIG. 6 is a sectional view of panel laminator 100, taken at 6-6 in FIG. 3. First heating blanket 182 may be attached to first frame 102 distal from first flexible diaphragm to create a first isolated heated environment 206 between the first heating blanket and the first flexible diaphragm. The first isolated heated environment may be enclosed by the first frame.

First isolated heated environment 206 may be insulated, at least in part, by first insulating layer 184 positioned so that first heating blanket 182 is positioned between first insulating layer 184 and first flexible diaphragm 104. The first insulating layer may be coupled to first frame 102 by a first insulating frame 208. First insulating frame 208 may have a shape substantially similar to first frame 102.

First isolated heated environment 206 may have a first depth 210 which may correspond to a distance between first heating blanket 182 and first flexible diaphragm 104. First depth 210 may or may not be constant throughout the first isolated heated environment. In some examples, first depth may be in a range of approximately one to two inches, though other ranges are also possible.

Panel laminator 100 may include a second heating blanket 212 attached to second frame 106 distal from second flexible diaphragm 108 to create a second isolated heated environment 214 between the second heating blanket and the second flexible diaphragm. The second isolated heated environment may be enclosed by the second frame.

Second isolated heated environment 214 may be insulated, at least in part, by a second insulating layer 216 positioned so that second heating blanket 212 is positioned between the second insulating layer and second flexible diaphragm 108. Second heating blanket 212 may be substantially similar to first heating blanket 182 described above, and the various features and benefits of the first heating blanket will not be repeated in their entirety in reference to the second heating blanket. For example, second heating blanket 212 may be secured to second insulating layer 216 via a set of retaining slats 218. Second insulating layer 216 may be substantially similar to first insulating layer 184 described above, and the various features and benefits of the first insulating layer will not be repeated in their entirety in reference to the second insulating layer. For example, the second insulating layer may include a second insulating frame 220 which may be substantially similar to first insulating frame 208.

Second isolated heated environment 214 may have a second depth 222 which may correspond to a distance between second heating blanket 212 and second flexible diaphragm 108. Second depth 222 may or may not be constant throughout the first isolated heated environment. In some examples, second depth may be in a range of approximately one to two inches, though other ranges are also possible.

Second isolated heated environment 214 may be similar to first isolated heated environment 206. One difference between the first and second isolated heated environments may be that the first isolated heated environment may include the one or more support bars 196 configured to provide support for the first flexible diaphragm. One or both of the first and second isolated heated environments may include atmospheric air, that is, normal air from the environment surrounding the apparatus.

Including one or both of the first and second isolated heated environments 206 and 214 may decrease the time required for application of a decorative laminate to panel 112 relative to a similar unheated device. In some examples, increasing the temperature of the panel and the laminate by increasing the temperature within one or both of the first and second isolated heated environments, via one or both of the first and second heating blankets 182 and 212, may reduce a lamination time from approximately 13 hours to a lamination time of approximately 1.5 hours. In some examples, the first and second isolated heated environments may be brought to a temperature in a range of approximately 120-140° F.

Figure 7:
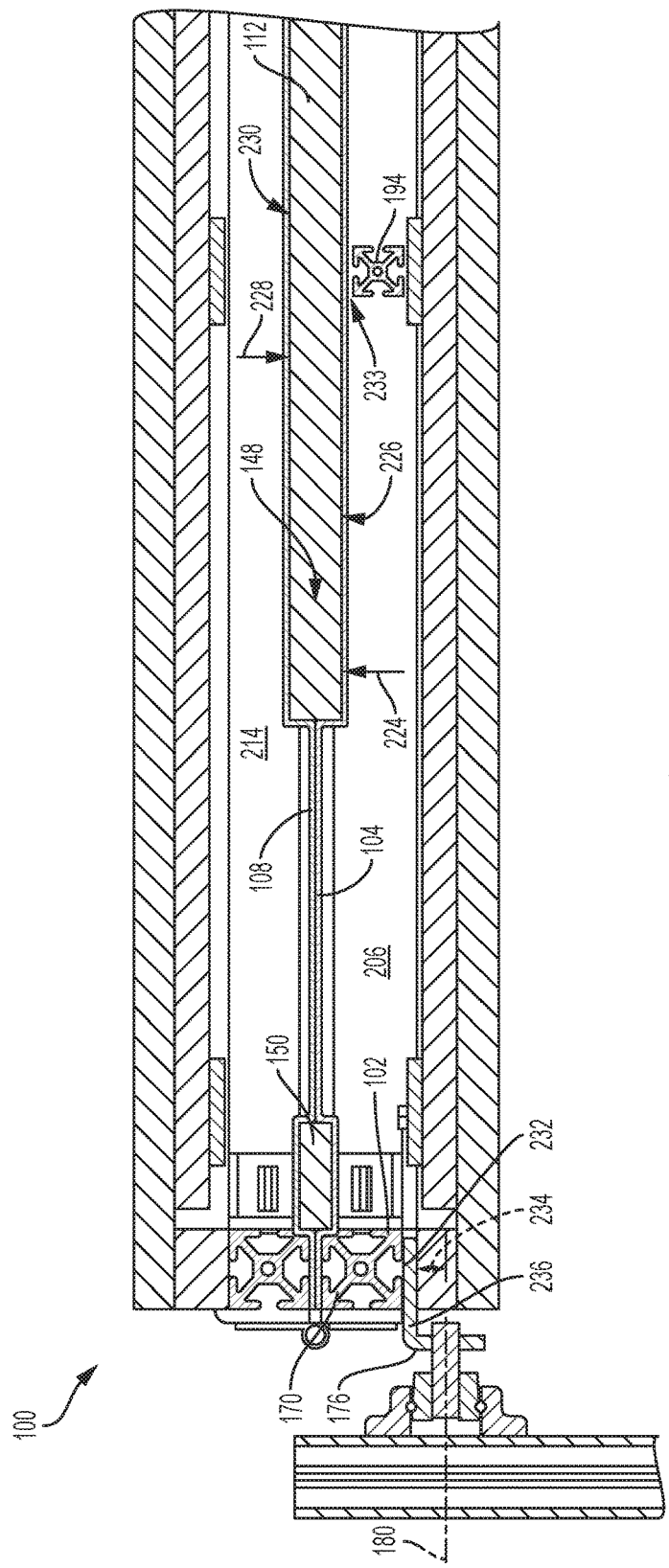
FIG. 7 is a diagrammatic representation of a detailed sectional view of the panel laminator of FIG. 2.

FIG. 7 is a detailed sectional view of panel laminator 100. FIG. 7 shows the panel laminator in a configuration where air has been substantially removed from the space 148 between first flexible diaphragm 104 and second flexible diaphragm 108. As the first isolated heated environment 206 may include atmospheric air, removing air from the space between the first and second diaphragms may result in a difference in pressure between the first isolated heated environment and the space between the first and second flexible diaphragms. Similarly, there may be a pressure differential between second isolated heated environment 214 and second flexible diaphragm 108.

First flexible diaphragm 104 may be configured to exert a force, indicated at force arrow 224, on a first major face 226 of panel 112, when panel 112 is disposed in space 148 between the first flexible diaphragm and second flexible diaphragm 108. Second flexible diaphragm 108 may be configured to exert a force, indicated at force arrow 228, on a second major face 230 of panel 112, when the panel is disposed in the space between the first flexible diaphragm and the second flexible diaphragm during a lamination and/or curing process.

Force 224 may be due to the difference in pressure between first isolated heated environment 206 and space 148 between the first and second flexible diaphragms. The flexible nature of the first flexible diaphragm may facilitate force 224 being applied to panel 112. Force 224 may facilitate application of a decorative laminate to the first major face of the panel.

First flexible diaphragm 104 may deform under the forces provided by the pressure differential between first isolated heated environment 206 and space 148. The first flexible diaphragm may conform to the shape of panel 112 and/or permeable layer 150 which may also be disposed within space 148. Forces 224 and 228 exerted on panel 112 by the first and second diaphragms may be perpendicular to the first and second major faces 226 and 230, respectively, of the panel.

In some examples, evacuating air from space 148 between first flexible diaphragm 104 and second flexible diaphragm 108 may cause the first flexible diaphragm to be spaced apart from the diaphragm support 194 after activation of a vacuum source and/or during a lamination process. That is, before air is evacuated from space 148, the first flexible diaphragm may rest upon the diaphragm support when apparatus 100 is in the horizontal orientation. Activation of the vacuum source and removal of air from space 148 may then cause the first flexible diaphragm to move slightly upward and create a gap or space 233 between the first flexible diaphragm and the diaphragm support. In some examples, space 233 may be created upon rotation of the apparatus from the generally horizontal orientation to the generally vertical orientation.

Figure 8:
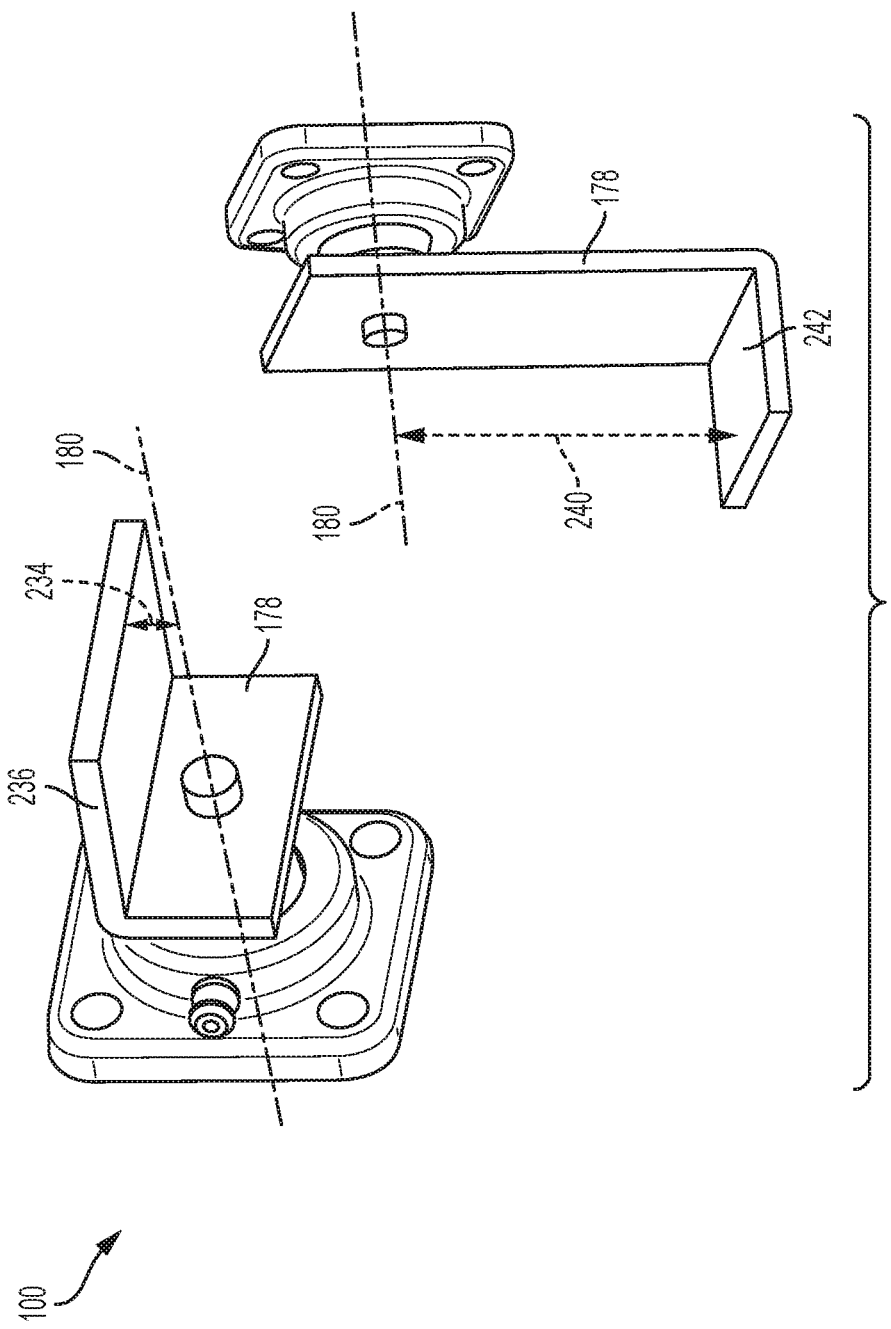
FIG. 8 is a diagrammatic representation of a detailed perspective view of a first coupler and a second coupler which facilitate rotation of the panel laminator of FIG. 2 about a generally horizontal rotation axis.

FIG. 8 is a detailed perspective view of first coupler 176 and second coupler 178 of panel laminator 100 described above. Regarding the first and second couplers, FIGS. 6, 7, and 8 are herein described together.

First coupler 176 may be attached to first edge portion 170 of first frame 102 at a first connection point 232. First connection point 232 may be located a first distance 234 away from rotation axis 180 of panel laminator 100. First coupler 176 may include a first connection flange 236 configured to be coupled to first frame 102 and the first connection flange may be disposed first distance 234 away from the rotation axis.

Second coupler 178 may be attached to second edge portion 174 of first frame 102 at a second connection point 238 located a second distance 240 away from rotation axis 180. Second coupler 178 may include a second connection flange 242 disposed second distance 240 away from the rotation axis. First connection point 232 may be displaced from the rotation axis opposite to the displacement of second connection point 238 from the rotation axis. That is, first connection flange 236 may be spaced from second connection flange 242 in a lateral direction by a distance equal to the sum of first distance 234 and second distance 240. Spacing the first and second connection points on opposite sides of the rotation axis may allow the non-planar apparatus to rotate about the rotation axis.

By spacing the first and second connection points 232 and 238 in opposite directions from rotation axis 180, a center of mass 244 of panel laminator 100 may be disposed proximate the rotation axis. Disposing the center of mass of the apparatus along the rotation axis may increase the stability of the apparatus in one or both of the horizontal and vertical orientations. See, for example, center of mass 244 disposed over base 156 in FIG. 4.

Example 2

Figure 9:
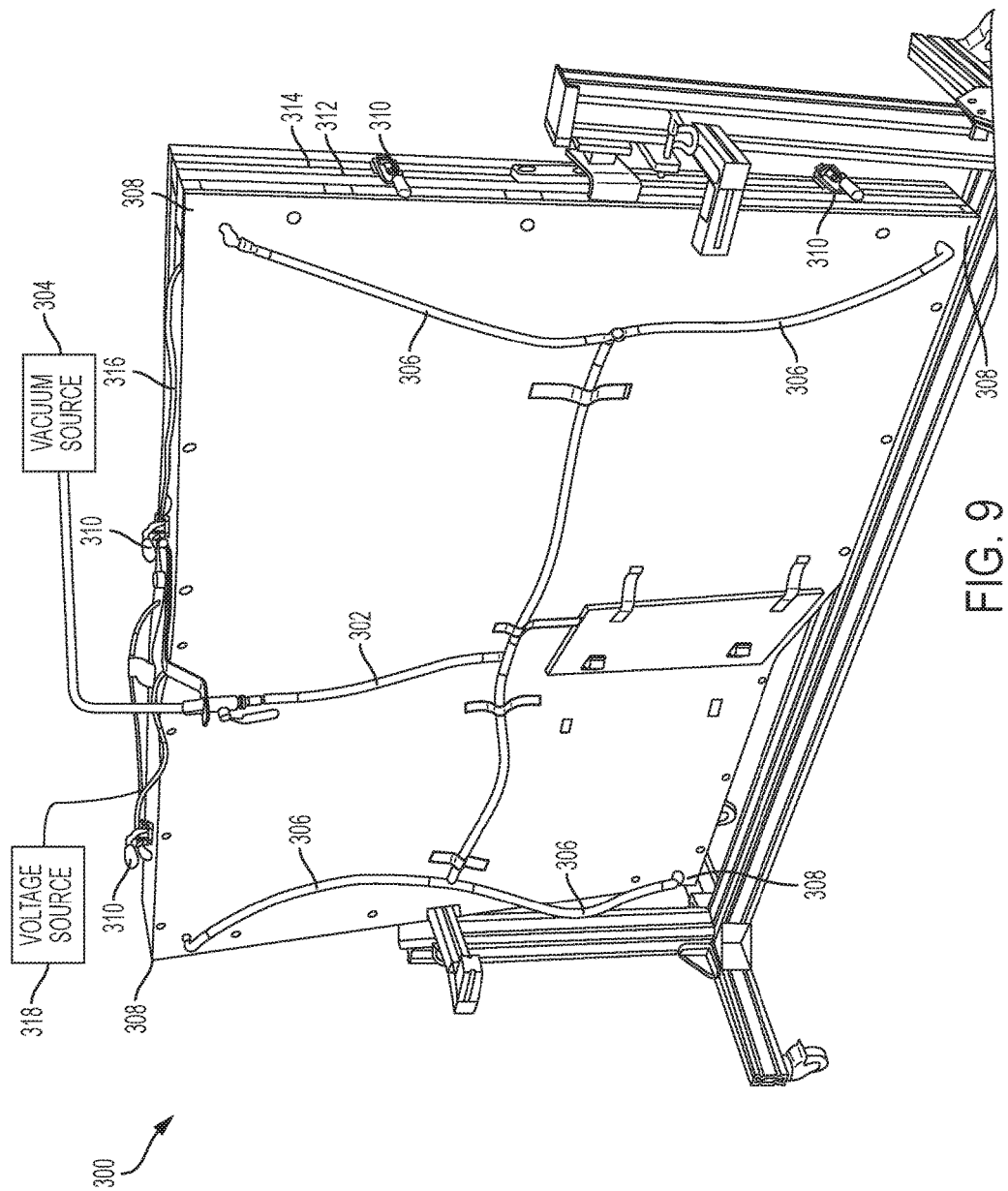
FIG. 9 is a diagrammatic representation of a perspective view of another illustrative embodiment of a panel laminator, showing a system of vacuum tubes configured to fluidly connect a space between a first and second flexible diaphragms to a vacuum system.

This example describes an illustrative panel laminator; see FIG. 9.

FIG. 9 is a perspective view of another illustrative embodiment of a panel laminator, generally indicated at 300. Panel laminator 300 may be similar to panel laminator 100 and the various features and benefits of panel laminator 100 will not be repeated in their entirety. Panel laminator 300 is shown in FIG. 9 in a closed configuration and a vertical orientation.

Panel laminator 300 may include a passage 302 fluidly connected to a space between a first flexible diaphragm and a second flexible diaphragm. Passage 302 may be configured to be coupled to a vacuum source or system, indicated schematically at 304. Passage 302 may include one or more sub-passages 306 fluidly connected to one another so that coupling any part of passage 302 to vacuum source 304 will draw air through all of the sub-passages. The embodiment shown in FIG. 9 includes four sub-passages configured to remove air from between the first and second flexible diaphragms from proximate four separate corners 308 of the apparatus. Other configurations of sub-passages are also possible.

Panel laminator 300 may include a plurality of clamps 310, latches, or other mechanisms configured to secure a first frame 312 of the panel laminator to a second frame 314 of the laminator. Panel laminator 300 may include one or more electrical connections 316. Electrical connections 316 may be configured to couple one or more heating blankets of the panel laminator to a voltage source 318.

Example 3

Figure 10:
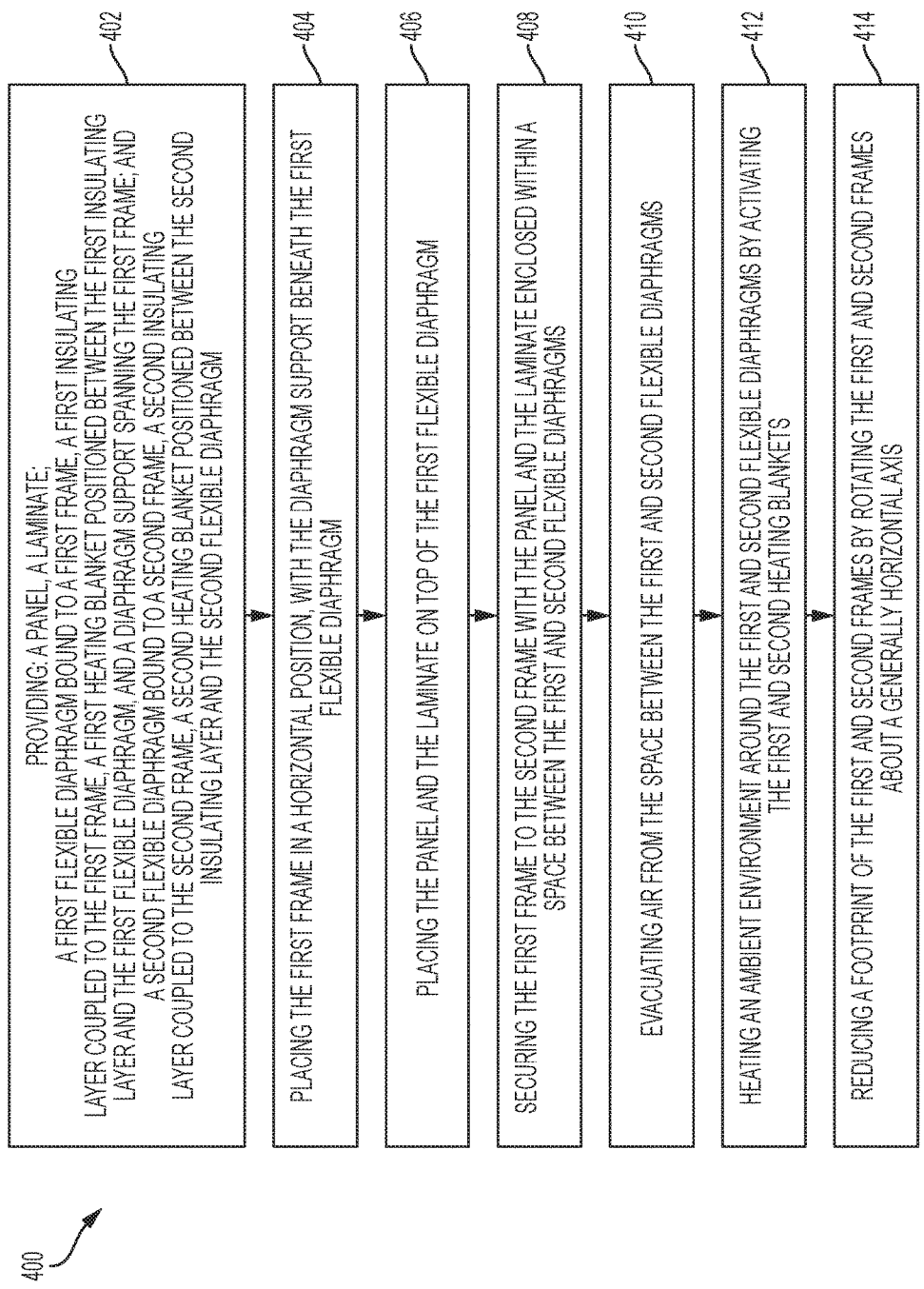
FIG. 10 is a diagrammatic representation of a flow chart illustrating a method of laminating a panel.

This examples describes an illustrative method of laminating a panel, which may be used in conjunction with any of the apparatuses described herein; see FIG. 10.

FIG. 10 depicts multiple steps of a method, generally indicated at 400 laminating a panel. Method 400 may be used in conjunction with any of the panel laminators depicted in and described in reference to FIGS. 1-9. Although various steps of method 400 are described below and depicted in FIG. 10, the steps need not necessarily all be performed, and in some cases may be performed in a different order than the order shown.

Method 400 may include a step 402 of providing a panel and a laminate to be applied to the panel. In some examples, step 402 may include providing a first laminate to be applied to a first major face of the panel and providing a second laminate to be applied to a second major face of the panel. In some examples, only one laminate may be provided. Any laminates may be pre-cut to an appropriate size. The one or more laminates may be preliminarily applied to the panel, for example, via a thermosetting adhesive.

Step 402 may further include providing a first flexible diaphragm bound to a first frame and a diaphragm support spanning the first frame. Providing the first flexible diaphragm bound to a first frame may include supporting the first flexible diaphragm against gravity by the diaphragm support coupled to the first frame. The diaphragm support may be configured to support the first flexible diaphragm against gravity prior to evacuating air from a space between the first flexible diaphragm and a second flexible diaphragm. The diaphragm support may be configured to be spaced apart from the first flexible diaphragm after evacuating air from the space between the first flexible diaphragm and the second flexible diaphragm.

Providing a diaphragm support spanning the first frame may include providing a support bar extending from a first lateral portion of the first frame to a second lateral portion of the first frame. The second lateral portion may be opposite the first lateral portion. In some examples, a plurality of support bars may span the first frame. In some examples, providing a support bar may include providing a support bar with a three-dimensional shape which corresponds to a non-planar shape of the panel. For example, if the panel has some curvature, one or more of the one or more support bars may have curvature that is complementary to the curvature of the panel.

Step 402 may include providing a second flexible diaphragm bound to a second frame. The second frame may have a shape that is complementary to the first frame. That is, the second frame may meet the first frame along a single closed loop. The closed loop along which the first and second frames meet may not lie in a single plane.

Step 402 may include providing a first insulating layer and a first heating blanket. The first insulating layer may be coupled to the first frame and positioned so that the first heating blanket is positioned between the first insulating layer and the first flexible diaphragm. Step 402 may further include providing a second insulating layer and a second heating blanket. The second insulating layer may be coupled to the second frame and positioned so that the second heating blanket is positioned between the second insulating layer and the second flexible diaphragm.

Method 400 may include a step 404 of placing the first frame in a generally horizontal position with the diaphragm support beneath the first flexible diaphragm relative to gravity. Including the diaphragm support may prevent delaminations or other defects, particularly near the center of the panel on the side of the panel adjacent the first flexible diaphragm.

Method 400 may include a step 406 of placing the panel and the laminate on top of the first flexible diaphragm. In some examples, step 406 may include placing a first laminate over the first flexible diaphragm, placing the panel over the first laminate, and placing a second laminate over the panel. One or both of the laminates may first be loosely secured to the panel via glue or a thermosetting adhesive.

Method 400 may include a step 408 of securing the first frame to the second frame so that the panel and the laminate to be applied to the panel enclosed within a space between the first flexible diaphragm and the second flexible diaphragm. In some examples, securing the first frame to the second frame may include rotating the second frame relative to the first frame. That is, the second frame may be coupled to the first frame by a rotatable connection at corresponding edge portions of the first frame and the second frame. The second frame rotating relative to the first frame may resemble a clamshell opening and closing.

Securing the first frame to the second frame may include securing edge portions of the first and second frames to one another via one or more clamps, latches, clasps, locks, or other fastening mechanisms. Securing the first frame to the second frame may create a substantially air-tight seal between the first and second flexible diaphragms.

In some examples, the second frame may not be rotatably coupled to the first frame. For example, the second frame, including the second flexible diaphragm may be kept remote and removed from the first frame until after the panel and laminate have been positioned over the first flexible diaphragm. The second frame may then be disposed over and adjacent to the first frame and subsequently secured to the first frame.

Method 400 may include a step 410 of evacuating air from the space between the first flexible diaphragm and the second flexible diaphragm. In some examples, evacuating air from the space between the first flexible diaphragm and the second flexible diaphragm may include coupling a vacuum source to a vacuum port fluidly connected to the space between the first flexible diaphragm and the second flexible diaphragm. The vacuum port may be in either of the first and second flexible diaphragms.

Prior to evacuating air from the space between the first flexible diaphragm and the second flexible diaphragm the first flexible diaphragm may be supported against gravity by the diaphragm support. The diaphragm support may prevent sagging of the first flexible diaphragm under its own weight and/or the weight of the panel on top of the first flexible diaphragm.

In some examples, after or subsequent to evacuating air from the space between the first flexible diaphragm and the second flexible diaphragm, the first flexible diaphragm may be spaced apart from the diaphragm support. This spacing may prevent marks or damage to a laminate on the same side of the panel as the diaphragm support during a lamination process. In some examples, evacuating the air from the space between the first and second flexible diaphragms may be sufficient to create the space between the first flexible diaphragm and the diaphragm support. In some examples, the space between the first and second diaphragms may be created upon rotating of the apparatus to a generally vertical orientation.

Method 400 may include a step 412 of heating an ambient environment around the first flexible diaphragm and the second flexible diaphragm by activating the first heating blanket and the second heating blanket. The ambient environment may also include the panel and the laminate. The first heating blanket may be attached to the first frame distal from the first flexible diaphragm and the second heating blanket may be attached to the second frame distal from the second flexible diaphragm.

In some examples, heating an ambient environment around the first and second flexible diaphragms, the panel, and the laminate may include heating a first isolated environment between the first heating blanket and the fir flexible diaphragm and heating a second isolated environment between the second heating blanket and the second flexible diaphragm. One or both of the heating blankets may be electrical heating blankets. Positioning the one or more heating blankets a distance away from the flexible diaphragms and heating an air-filled environment around the flexible diaphragms may lead to more even heating of the panel and the laminate than if the heating blankets are directly applied to the flexible diaphragms. Step 412 may be performed for an amount of time sufficient to secure one or more laminates to the panel. In some examples, 1.5 hours may be sufficient to secure the one or more laminates to the panel, though other times are also possible.

Method 400 may include a step 414 of reducing a footprint of the first frame and the second frame by rotating the first frame and the second frame about a generally horizontal rotation axis. This rotation may occur when the first and second frames are secured to one another and/or are in a closed configuration with the panel and the laminate disposed in the space between the first and second flexible diaphragms.

In some examples, reducing a footprint of the first and second frames may include coupling a first edge portion of the first frame to an apparatus support and coupling a second edge portion of the first frame to an apparatus support. The second edge portion may be opposite the first edge portion. The first edge portion may include a first connection point spaced a first distance away from the horizontal rotation axis and the second edge portion may include a second connection point spaced a second distance away from the horizontal rotation axis. The second distance may be different than the first distance. In particular, the second distance may be different from the first distance in cases where the first and second frames have a three-dimensional shape corresponding to a non-planar shape of the panel.

In some examples, reducing a footprint of the first and second frames may include hanging the first and second frames as secured to one another in a vertical orientation. For example, chains or other support lines may be coupled to the apparatus at one or more points along an edge of the apparatus, and the apparatus may be subsequently lifted and rotated to a vertical orientation.

Example 4

This section describes additional aspects and features of examples, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A panel laminator comprising:

a first frame defining an outer boundary, the first frame operable to support a panel to be laminated;

a first flexible diaphragm supported by the first frame to cover the outer boundary;

a second frame sized and shaped to conform to the first frame along the outer boundary;

a second flexible diaphragm supported by the second frame to match the outer boundary;

a first heating blanket attached to the first frame distal from the first flexible diaphragm to create an isolated heated environment between the first heating blanket and the first flexible diaphragm, and enclosed by the first frame;

a second heating blanket attached to the second frame distal from the second flexible diaphragm to create an isolated heated environment between the second heating blanket and the second flexible diaphragm, and enclosed by the second frame;

a permeable layer positioned between the first flexible diaphragm and the second flexible diaphragm; and a vacuum port operable to connect a vacuum source to the permeable layer between the first flexible diaphragm and the second flexible diaphragm.

A2. The panel laminator of paragraph A1, further comprising:

a diaphragm support configured to (a) provide support for the first flexible diaphragm against gravity prior to activation of the vacuum source and (b) be spaced apart from the first flexible diaphragm after activation of the vacuum source and during a lamination process.

A3. The panel laminator of paragraph A1, further comprising:

a first insulating layer positioned so that the first heating blanket is positioned between the first insulating layer and the first flexible diaphragm; and a second insulating layer positioned so that the second heating blanket is positioned between the second insulating layer and the second flexible diaphragm.

A4. The panel laminator of paragraph A1, wherein the vacuum port is in the first flexible diaphragm proximate the permeable layer.

A5. The panel laminator of paragraph A1, wherein the second frame is coupled to the first frame to provide for angular separation of the second frame relative to the first frame.

A6. The panel laminator of paragraph A1, further comprising:

a first rotatable connection on a first edge portion of the first frame; and a second rotatable connection on a second edge portion of the first frame;

wherein the first rotatable connection and the second rotatable connection are configured so that the first frame and the second frame are configured to rotate as a unit when secured to one another between a first, generally horizontal, orientation and a second, generally vertical, orientation.

A7. The panel laminator of paragraph A1, wherein the panel has a non-planar shape, the first frame has a three-dimensional shape which corresponds to the non-planar shape of the panel, the second frame has a three-dimensional shape which corresponds to the non-planar shape of the panel, and the three-dimensional shape of the first frame is complementary to the three-dimensional shape of the second frame.

A8. The panel laminator of paragraph A7, further comprising:

a first coupler attached to a first edge portion of the first frame at a first connection point located a first distance away from a rotation axis of the panel laminator; and a second coupler attached to a second edge portion of the first frame at a second connection point located a second distance away from the rotation axis of the panel laminator.

A9. The panel laminator of paragraph A1, wherein the second frame is configured to be coupled to the first frame so that the first flexible diaphragm is proximate the second flexible diaphragm, thereby creating a space between the first flexible diaphragm and the second flexible diaphragm.

A10. The panel laminator of paragraph A9, wherein the first flexible diaphragm is configured to exert a force on a first major face of a panel disposed in the space between the first flexible diaphragm and the second flexible diaphragm and the second flexible diaphragm is configured to exert a force on a second major face of the panel when air has been removed from the space between the first flexible diaphragm and the second flexible diaphragm during a lamination process.

B1. An apparatus for laminating a panel, the apparatus comprising:

a first flexible diaphragm;

a first frame bound to the first flexible diaphragm;

a second flexible diaphragm;

a second frame bound to the second flexible diaphragm, the second frame configured to be coupled to the first frame so that the first flexible diaphragm is proximate the second flexible diaphragm, thereby creating a space between the first flexible diaphragm and the second flexible diaphragm;

a first heating blanket coupled to the first frame and spaced apart from the first flexible diaphragm to create an isolated heated environment between the first heating blanket and the first flexible diaphragm;

a second heating blanket coupled to the second frame and spaced apart from the second flexible diaphragm to create an isolated heated environment between the second heating blanket and the second flexible diaphragm; and a passage fluidly connected to the space between the first flexible diaphragm and the second flexible diaphragm, the passage configured to be coupled to a vacuum system in order to remove air from the space between the first flexible diaphragm and the second flexible diaphragm during a lamination process;

wherein the first frame and the second frame are configured to rotate as a unit when secured to one another between a first, generally horizontal, orientation and a second, generally vertical, orientation.

B2. The apparatus of paragraph B1, further comprising:

a diaphragm support configured to (a) provide support for the first flexible diaphragm against gravity prior to activation of the vacuum source and (b) be spaced apart from the first flexible diaphragm after activation of the vacuum source and during a lamination process.

B3. The apparatus of paragraph B1, wherein the first flexible diaphragm is configured to exert a force on a first major face of a panel disposed in the space between the first flexible diaphragm and the second flexible diaphragm and the second flexible diaphragm is configured to exert a force on a second major face of the panel when air has been removed from the space between the first flexible diaphragm and the second flexible diaphragm during a lamination process.

B4. The apparatus of paragraph B1, further comprising:
a permeable layer positioned between the first flexible diaphragm and the second flexible diaphragm;
wherein the passage is through the first flexible diaphragm proximate the permeable layer.

B5. The apparatus of paragraph B1, further comprising:
a first insulating layer positioned so that the first heating blanket is positioned between the first insulating layer and the first flexible diaphragm; and
a second insulating layer positioned so that the second heating blanket is positioned between the second insulating layer and the second flexible diaphragm.

B6. The apparatus of paragraph B1, wherein the second frame is coupled to the first frame to provide for angular separation of the second frame relative to the first frame.

B7. The apparatus of paragraph B1, further comprising:
a first rotatable connection on a first edge portion of the first frame; and
a second rotatable connection on a second edge portion of the first frame;
wherein the first rotatable connection and the second rotatable connection are configured so that the first frame and the second frame are configured to rotate as a unit when secured to one another between a first, generally horizontal, orientation and a second, generally vertical, orientation.

B8. The apparatus of paragraph B1, wherein the panel has a non-planar shape, the first frame has a three-dimensional shape which corresponds to the non-planar shape of the panel, the second frame has a three-dimensional shape which corresponds to the non-planar shape of the panel, and the three-dimensional shape of the first frame is complementary to the three-dimensional shape of the second frame.

B9. The apparatus of paragraph B8, further comprising:
a first coupler attached to a first edge portion of the first frame at a first connection point located a first distance away from a rotation axis of the panel laminator; and
a second coupler attached to a second edge portion of the first frame at a second connection point located a second distance away from the rotation axis of the panel laminator.

C1. A panel laminator comprising:
a first frame defining an outer boundary, the first frame operable to support a panel to be laminated;
a first flexible diaphragm supported by the first frame to cover the outer boundary;
a second frame sized and shaped to conform to the first frame along the outer boundary;
a second flexible diaphragm supported by the second frame to match the outer boundary;
a permeable layer positioned between the first flexible diaphragm and the second flexible diaphragm;
a vacuum port operable to connect a vacuum source to the permeable layer between the first flexible diaphragm and the second flexible diaphragm; and
a diaphragm support configured to (a) provide support for the first flexible diaphragm against gravity prior to activation of the vacuum source and (b) be spaced apart from the first flexible diaphragm after activation of the vacuum source and during a lamination process.

C2. The panel laminator of paragraph C1, wherein the diaphragm support spans an area enclosed by the first frame.

C3. The panel laminator of paragraph C2, wherein the diaphragm support includes a support bar extending from a first lateral portion of the first frame to a second lateral portion of the first frame, the second lateral portion opposite the first lateral portion.

C4. The panel laminator of paragraph C3, wherein the support bar has a three-dimensional shape which corresponds to a non-planar shape of a panel to be received in a space between the first flexible diaphragm and the second flexible diaphragm.

C5. The panel laminator of paragraph C1, further comprising:
a first heating blanket attached to the first frame distal from the first flexible diaphragm to create an isolated heated environment between the first heating blanket and the first flexible diaphragm, and enclosed by the first frame; and
a second heating blanket attached to the second frame distal from the second flexible diaphragm to create an isolated heated environment between the second heating blanket and the second flexible diaphragm, and enclosed by the second frame.

C6. The panel laminator of paragraph C1, wherein the second frame is coupled to the first frame to provide for angular separation of the second frame relative to the first frame.

C7. The panel laminator of paragraph C1, further comprising:
a first rotatable connection on a first edge portion of the first frame; and
a second rotatable connection on a second edge portion of the first frame;
wherein the first rotatable connection and the second rotatable connection are configured so that the first frame and the second frame are configured to rotate as a unit when secured to one another between a first, generally horizontal, orientation and a second, generally vertical, orientation.

C8. The panel laminator of paragraph C1, wherein the panel has a non-planar shape, the first frame has a three-dimensional shape which corresponds to the non-planar shape of the panel, the second frame has a three-dimensional shape which corresponds to the non-planar shape of the panel, and the three-dimensional shape of the first frame is complementary to the three-dimensional shape of the second frame.

C9. The panel laminator of paragraph C8, further comprising:
a first coupler attached to a first edge portion of the first frame at a first connection point located a first distance away from a rotation axis of the panel laminator; and
a second coupler attached to a second edge portion of the first frame at a second connection point located a second distance away from the rotation axis of the panel laminator.

C10. The panel laminator of paragraph C1, wherein the second frame is configured to be coupled to the first frame so that the first flexible diaphragm is proximate the second flexible diaphragm, thereby creating a space between the first flexible diaphragm and the second flexible diaphragm.

C11. The panel laminator of paragraph C10, wherein the first flexible diaphragm is configured to exert a force on a first major face of a panel disposed in the space between the first flexible diaphragm and the second flexible diaphragm and the second flexible diaphragm is configured to exert a force on a second major face of the panel when air has been removed from the space between the first flexible diaphragm and the second flexible diaphragm during a lamination process.

D1. An apparatus for laminating a panel, the apparatus comprising:
a first flexible diaphragm;
a first frame bound to the first flexible diaphragm;
a second flexible diaphragm;
a second frame bound to the second flexible diaphragm, the second frame configured to be coupled to the first frame so that the first flexible diaphragm is proximate the second flexible diaphragm, thereby creating a space between the first flexible diaphragm and the second flexible diaphragm;
a passage fluidly connected to the space between the first flexible diaphragm and the second flexible diaphragm, the passage configured to be coupled to a vacuum system in order to remove air from the space between the first flexible diaphragm and the second flexible diaphragm during a lamination process; and
a diaphragm support configured to (a) provide support for the first flexible diaphragm against gravity prior to activation of the vacuum system and (b) be spaced from the first flexible diaphragm after activation of the vacuum system and during a lamination process;
wherein the first frame and the second frame are configured to rotate as a unit between a first, generally horizontal, orientation and a second, generally vertical, orientation.

D2. The apparatus of paragraph D1, wherein the diaphragm support spans an area enclosed by the first frame.

D3. The apparatus of paragraph D2, wherein the diaphragm support includes a support bar extending from a first lateral portion of the first frame to a second lateral portion of the first frame, the second lateral portion opposite the first lateral portion.

D4. The apparatus of paragraph D3, wherein the support bar has a three-dimensional shape which corresponds to a non-planar shape of a panel to be received in a space between the first flexible diaphragm and the second flexible diaphragm.

D5. The apparatus of paragraph D1, further comprising:
a first heating blanket attached to the first frame distal from the first flexible diaphragm to create an isolated heated environment between the first heating blanket and the first flexible diaphragm, and enclosed by the first frame; and
a second heating blanket attached to the second frame distal from the second flexible diaphragm to create an isolated heated environment between the second heating blanket and the second flexible diaphragm, and enclosed by the second frame.

D6. The apparatus of paragraph D1, further comprising:
a permeable layer positioned between the first flexible diaphragm and the second flexible diaphragm;
wherein the passage is through the first flexible diaphragm proximate the permeable layer.

D7. The apparatus of paragraph D1, wherein the first flexible diaphragm is configured to exert a force on a first major face of a panel disposed in the space between the first flexible diaphragm and the second flexible diaphragm and the second flexible diaphragm is configured to exert a force on a second major face of the panel when air has been removed from the space between the first flexible diaphragm and the second flexible diaphragm during a lamination process.

D8. The apparatus of paragraph D1, wherein the second frame is coupled to the first frame to provide for angular separation of the second frame relative to the first frame.

D9. The apparatus of paragraph D1, further comprising:
a first rotatable connection on a first edge portion of the first frame; and
a second rotatable connection on a second edge portion of the first frame;
wherein the first rotatable connection and the second rotatable connection are configured so that the first frame and the second frame are configured to rotate as a unit when secured to one another between a first, generally horizontal, orientation and a second, generally vertical, orientation.

D10. The apparatus of paragraph D1, wherein the panel has a non-planar shape, the first frame has a three-dimensional shape which corresponds to the non-planar shape of the panel, the second frame has a three-dimensional shape which corresponds to the non-planar shape of the panel, and the three-dimensional shape of the first frame is complementary to the three-dimensional shape of the second frame.

D11. The apparatus of paragraph D10, further comprising:
a first coupler attached to a first edge portion of the first frame at a first connection point located a first distance away from a rotation axis of the panel laminator; and
a second coupler attached to a second edge portion of the first frame at a second connection point located a second distance away from the rotation axis of the panel laminator.

E1. A method of laminating a panel, the method comprising:
providing a panel and a laminate to be applied to the panel;
providing a first flexible diaphragm bound to a first frame and a second flexible diaphragm bound to a second frame;
securing the first frame to the second frame so that the panel and the laminate to be applied to the panel are enclosed within a space between the first flexible diaphragm and the second flexible diaphragm;
evacuating air from the space between the first flexible diaphragm and the second flexible diaphragm; and
heating an ambient environment around the first flexible diaphragm and the second flexible diaphragm, the panel, and the laminate by activating a first heating blanket attached to the first frame distal from the first flexible diaphragm and a second heating blanket attached to the second frame distal from the second flexible diaphragm.

E2. The method of paragraph E1, wherein providing a panel and a laminate to be applied to the panel includes providing a first laminate to be applied to a first major face of the panel and providing a second laminate to be applied to a second major face of the panel.

E3. The method of paragraph E1, wherein providing a first flexible diaphragm bound to a first frame includes supporting the first flexible diaphragm against gravity by a diaphragm support coupled to the first frame, the diaphragm support configured to support the first flexible diaphragm against gravity prior to evacuating air from the space between the first flexible diaphragm and the second flexible diaphragm.

E4. The method of paragraph E3, wherein the diaphragm support is configured to be spaced apart from the first flexible diaphragm after evacuating air from the space between the first flexible diaphragm and the second flexible diaphragm.

E5. The method of paragraph E1, wherein securing the first frame to the second frame includes rotating the second frame relative to the first frame, the second frame coupled to the first frame by a rotatable connection at corresponding edge portions of the first frame and the second frame.

E6. The method of paragraph E1, wherein evacuating air from the space between the first flexible diaphragm and the second flexible diaphragm includes coupling a vacuum source to a vacuum port fluidly connected to the space between the first flexible diaphragm and the second flexible diaphragm.

E7. The method of paragraph E1, wherein heating an ambient environment around the first flexible diaphragm and the second flexible diaphragm, the panel, and the laminate includes heating a first isolated environment between the first heating blanket and the first flexible diaphragm and heating a second isolated environment between the second heating blanket and the second flexible diaphragm.

E8. The method of paragraph E1, further comprising:
providing a first insulating layer positioned so that the first heating blanket is positioned between the first insulating layer and the first flexible diaphragm; and
providing a second insulating layer positioned so that the second heating blanket is positioned between the second insulating layer and the second flexible diaphragm.

E9. The method of paragraph E1, further comprising:
reducing a footprint of the first frame and the second frame by rotating the first frame and the second frame as secured to one another about a generally horizontal rotation axis.

E10. The method of paragraph E9, wherein reducing a footprint of the first frame and the second frame includes coupling a first edge portion of the first frame to an apparatus support and coupling a second edge portion of the first frame to an apparatus support, the second edge portion opposite the first edge portion, and wherein the first edge portion includes a first connection point spaced a first distance away from the generally horizontal rotation axis and the second edge portion includes a second connection point spaced a second distance away from the generally horizontal rotation axis, the second distance different than the first distance.

F1. A method of laminating a panel, the method comprising:
providing a panel and a laminate to be applied to the panel;
providing a first flexible diaphragm bound to a first frame and a second flexible diaphragm bound to a second frame;
providing a diaphragm support spanning the first frame;
placing the first frame in a generally horizontal position, with the diaphragm support beneath the first flexible diaphragm relative to gravity;
placing the panel and the laminate on top of the first flexible diaphragm;
securing the second frame to the first frame so that the panel and the laminate to be applied to the panel are enclosed within a space between the first flexible diaphragm and the second flexible diaphragm; and
evacuating air from the space between the first flexible diaphragm and the second flexible diaphragm;
wherein the first flexible diaphragm is (a) supported against gravity by the diaphragm support prior to evacuating air from the space between the first flexible diaphragm and the second flexible diaphragm and (b) spaced apart from the diaphragm support subsequent to evacuating air from the space between the first flexible diaphragm and the second flexible diaphragm.

F2. The method of claim F1, wherein providing a panel and a laminate to be applied to the panel includes providing a first laminate to be applied to a first major face of the panel and providing a second laminate to be applied to a second major face of the panel.

F3. The method of paragraph F1, wherein securing the first frame to the second frame includes rotating the second frame relative to the first frame, the second frame coupled to the first frame by a rotatable connection at corresponding edge portions of the first frame and the second frame.

F4. The method of paragraph F1, wherein evacuating air from the space between the first flexible diaphragm and the second flexible diaphragm includes coupling a vacuum source to a vacuum port fluidly connected to the space between the first flexible diaphragm and the second flexible diaphragm.

F5. The method of claim F1, wherein providing a diaphragm support spanning the first frame includes providing a support bar extending from a first lateral portion of the first frame to a second lateral portion of the first frame, the second lateral portion opposite the first lateral portion.

F6. The method of claim F5, wherein providing a support bar includes providing a support bar with a three-dimensional shape which corresponds to a non-planar shape of the panel.

F7. The method of paragraph F1, further comprising:
reducing a footprint of the first frame and the second frame by rotating the first frame and the second frame as secured to one another about a generally horizontal rotation axis.

F8. The method of paragraph F7, wherein reducing a footprint of the first frame and the second frame includes coupling a first edge portion of the first frame to an apparatus support and coupling a second edge portion of the first frame to an apparatus support, the second edge portion opposite the first edge portion, and wherein the first edge portion includes a first connection point spaced a first distance away from the generally horizontal rotation axis and the second edge portion includes a second connection point spaced a second distance away from the generally horizontal rotation axis, the second distance different than the first distance.

F9. The method of paragraph F1, further comprising:
heating an ambient environment around the first flexible diaphragm and the second flexible diaphragm, the panel, and the laminate by activating a first heating blanket attached to the first frame distal from the first flexible diaphragm and a second heating blanket attached to the second frame distal from the second flexible diaphragm.

F10. The method of paragraph F9, wherein heating an ambient environment around the first flexible diaphragm and the second flexible diaphragm, the panel, and the laminate includes heating a first isolated environment between the first heating blanket and the first flexible diaphragm and heating a second isolated environment between the second heating blanket and the second flexible diaphragm.

Advantages, Features, Benefits

The different embodiments of the panel laminators described herein provide several advantages over known solutions for applying a decorative laminate to a panel. For example, the illustrative embodiments of panel laminators described herein allow for decorative laminates that are relatively free of defects. Additionally, and among other benefits, illustrative embodiments of the panel laminators described herein allow a decorative laminate to be applied in a shorter amount of time through the use of heating blankets. Additionally, and among other benefits, illustrative embodiments of the panel laminators described herein may have a variably-sized footprint, which may allow the device to be stowed during a lamination process or when not in use. No known system or device can perform these functions, particularly for panels having a non-planar shape, for panels requiring a decorative laminate on two sides, and in such a cost-effective manner. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A panel laminator comprising:
   a first frame defining an outer boundary, the first frame operable to support a panel to be laminated;
   a first flexible diaphragm supported by the first frame to cover the outer boundary;
   a second frame sized and shaped to conform to the first frame along the outer boundary;
   a second flexible diaphragm supported by the second frame to match the outer boundary;
   a first heating blanket attached to the first frame distal from the first flexible diaphragm to create an isolated heated environment between the first heating blanket and the first flexible diaphragm, and enclosed by the first frame wherein the first flexible diaphragm and the first heating blanket are separated by a plurality of support bars spanning between first and second lateral portions of the first frame;
   a second heating blanket attached to the second frame distal from the second flexible diaphragm to create an isolated heated environment between the second heating blanket and the second flexible diaphragm, and enclosed by the second frame;
   a permeable layer positioned between the first flexible diaphragm and the second flexible diaphragm; and
   a vacuum port operable to connect a vacuum source to the permeable layer between the first flexible diaphragm and the second flexible diaphragm.

2. The panel laminator of claim 1, further comprising:
   a first insulating layer positioned so that the first heating blanket is positioned between the first insulating layer and the first flexible diaphragm; and
   a second insulating layer positioned so that the second heating blanket is positioned between the second insulating layer and the second flexible diaphragm.

3. The panel laminator of claim 1, wherein the second frame is coupled to the first frame to provide for angular separation of the second frame relative to the first frame.

4. The panel laminator of claim 1, further comprising:
   a first rotatable connection on a first edge portion of the first frame; and
   a second rotatable connection on a second edge portion of the first frame;
   wherein the first rotatable connection and the second rotatable connection are configured so that the first frame and the second frame are configured to rotate as a unit when secured to one another between a first, generally horizontal, orientation and a second, generally vertical, orientation.

5. The panel laminator of claim 1, wherein the panel has a non-planar shape, the first frame has a three-dimensional shape which corresponds to the non-planar shape of the panel, the second frame has a three-dimensional shape which corresponds to the non-planar shape of the panel, and the three-dimensional shape of the first frame is complementary to the three-dimensional shape of the second frame.

6. The panel laminator of claim 5, further comprising:
   a first coupler attached to a first edge portion of the first frame at a first connection point located a first distance away from a rotation axis of the panel laminator; and
   a second coupler attached to a second edge portion of the first frame at a second connection point located a second distance away from the rotation axis of the panel laminator.

7. The panel laminator of claim 1, wherein the first heating blanket is at least partially retained by a plurality of slats spanning lateral portions of a first insulation layer.

8. The panel laminator of claim 1, wherein at least one of the plurality of support bars is oriented at a different angle relative to another of the plurality of support bars corresponding to different planar sections of the panel.

9. The panel laminator of claim 7, wherein each support bar of the plurality of support bars is aligned with a slat of the plurality of slats.

10. An apparatus for laminating a panel, the apparatus comprising:
    a first flexible diaphragm;
    a first frame bound to the first flexible diaphragm;
    a second flexible diaphragm;
    a second frame bound to the second flexible diaphragm, the second frame configured to be coupled to the first frame so that the first flexible diaphragm is proximate the second flexible diaphragm, thereby creating a space between the first flexible diaphragm and the second flexible diaphragm;
    a passage fluidly connected to the space between the first flexible diaphragm and the second flexible diaphragm, the passage configured to be coupled to a vacuum system in order to remove air from the space between the first flexible diaphragm and the second flexible diaphragm during a lamination process; and
    a diaphragm support configured to (a) provide support for the first flexible diaphragm against gravity prior to activation of the vacuum system and (b) be spaced from the first flexible diaphragm after activation of the vacuum system and during the lamination process, wherein the diaphragm support includes a plurality of support bars spanning between first and second lateral portions of the first frame and wherein at least one of the support bars has a three-dimensional shape configured to correspond to a non-planar shape of a panel to be received in a space between the first flexible diaphragm and the second flexible diaphragm;
    wherein the first frame and the second frame are configured to rotate as a unit between a first, generally horizontal, orientation and a second, generally vertical, orientation.

11. The apparatus of claim 10, further comprising:
a first heating blanket attached to the first frame distal from the first flexible diaphragm to create an isolated heated environment between the first heating blanket and the first flexible diaphragm, and enclosed by the first frame; and
a second heating blanket attached to the second frame distal from the second flexible diaphragm to create an isolated heated environment between the second heating blanket and the second flexible diaphragm, and enclosed by the second frame.

12. The apparatus of claim 10, wherein the first flexible diaphragm is configured to exert a force on a first major face of a panel disposed in the space between the first flexible diaphragm and the second flexible diaphragm and the second flexible diaphragm is configured to exert a force on a second major face of the panel when air has been removed from the space between the first flexible diaphragm and the second flexible diaphragm during the lamination process.

13. The apparatus of claim 10, wherein the diaphragm support spans an area enclosed by the first frame.

14. A method of laminating a panel, the method comprising:
providing a panel and a laminate to be applied to the panel;
providing a first flexible diaphragm bound to a first frame and a second flexible diaphragm bound to a second frame;
securing the first frame to the second frame so that the panel and the laminate to be applied to the panel are enclosed within a space between the first flexible diaphragm and the second flexible diaphragm;
evacuating air from the space between the first flexible diaphragm and the second flexible diaphragm; and
heating an ambient environment around the first flexible diaphragm and the second flexible diaphragm, the panel, and the laminate by activating a first heating blanket attached to the first frame distal from the first flexible diaphragm and a second heating blanket attached to the second frame distal from the second flexible diaphragm, wherein the first flexible diaphragm and the first heating blanket are separated by a plurality of support bars spanning between first and second lateral portions of the first frame.

15. The method of claim 14, wherein providing a panel and a laminate to be applied to the panel includes providing a first laminate to be applied to a first major face of the panel and providing a second laminate to be applied to a second major face of the panel.

16. The method of claim 14, wherein heating an ambient environment around the first flexible diaphragm and the second flexible diaphragm, the panel, and the laminate includes heating a first isolated environment between the first heating blanket and the first flexible diaphragm and heating a second isolated environment between the second heating blanket and the second flexible diaphragm.

17. The method of claim 14, wherein providing a first flexible diaphragm bound to a first frame includes supporting the first flexible diaphragm against gravity by a diaphragm support coupled to the first frame, the diaphragm support configured to support the first flexible diaphragm against gravity prior to evacuating air from the space between the first flexible diaphragm and the second flexible diaphragm.

18. The method of claim 17, wherein the diaphragm support is configured to be spaced apart from the first flexible diaphragm after evacuating air from the space between the first flexible diaphragm and the second flexible diaphragm.

19. The method of claim 14, further comprising:
reducing a footprint of the first frame and the second frame by rotating the first frame and the second frame as secured to one another about a generally horizontal rotation axis.

20. The method of claim 19, wherein reducing a footprint of the first frame and the second frame includes coupling a first edge portion of the first frame to an apparatus support and coupling a second edge portion of the first frame to an apparatus support, the second edge portion opposite the first edge portion, and wherein the first edge portion includes a first connection point spaced a first distance away from the generally horizontal rotation axis and the second edge portion includes a second connection point spaced a second distance away from the generally horizontal rotation axis, the second distance different than the first distance.

* * * * *